(No Model.)

P. W. WILLANS.
ELECTRIC CLUTCH.

No. 473,042. Patented Apr. 19, 1892.

Witnesses

Inventor;
Peter W. Willans
by his attorneys

UNITED STATES PATENT OFFICE.

PETER WILLIAM WILLANS, OF LONDON, ENGLAND.

ELECTRIC CLUTCH.

SPECIFICATION forming part of Letters Patent No. 473,042, dated April 19, 1892.

Application filed July 21, 1891. Serial No. 400,228. (No model.)

*To all whom it may concern:*

Be it known that I, PETER WILLIAM WILLANS, a subject of the Queen of Great Britain, residing at Ferry Works, Thames, Ditton, London, in the county of Surrey, England, have invented certain new and useful Improvements in Electric Clutches, of which the following is a specification.

The object of my invention is to operatively connect and disconnect two shafts by clutch members which are not brought into direct contact with each other. In order to connect two shafts in line with each other, one the driving and the other the driven shaft, I fix upon the one an iron cross-head or magnetic core with projecting extremities and carrying electric-circuit windings in planes parallel to the axis, and upon the other shaft I mount an iron wheel or ring having internal projections which are in close proximity to but do not touch the cross-head as it revolves. The outside ring or wheel is wound with coils, through which an electric current may be passed, so that one part is magnetized and the other part completes the magnetic circuit. The extremities and projections may be so fashioned as to present a series of poles with intervals between them.

Figure 3:
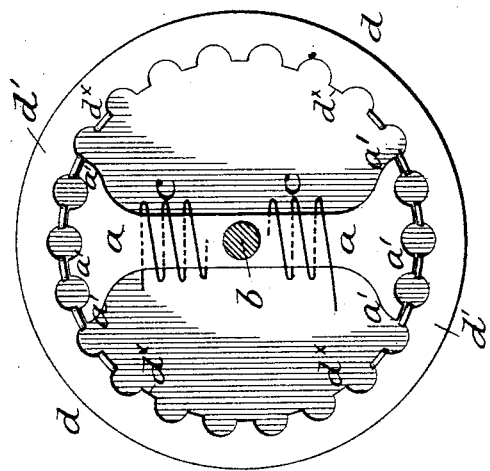
Figure 2:
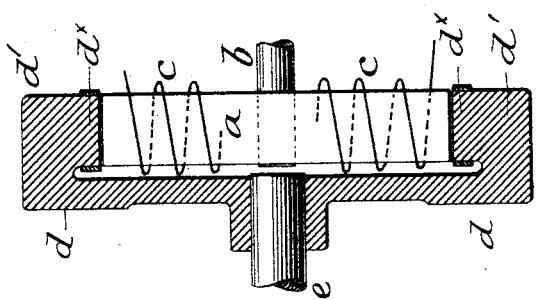
Figure 1:
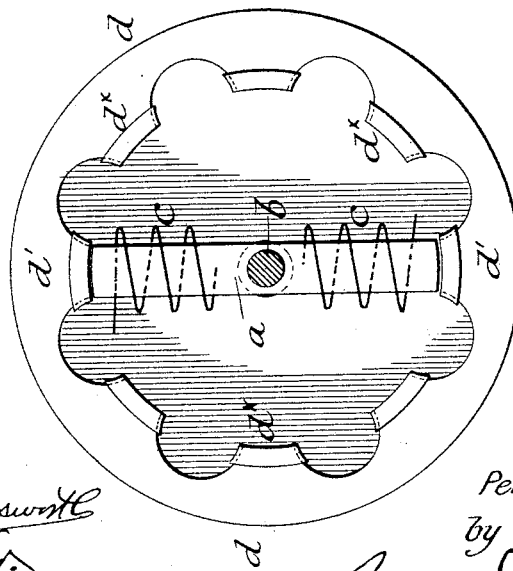

In the accompanying drawings, Figure 1 is an end view, partly diagrammatic and with the shaft in section, showing my improved clutch. Fig. 2 is a view, partly in section and partly in elevation, showing the two members of the clutch and the shafts to which they are secured. Fig. 3 is a view of a modified form of clutch.

In Figs. 1 and 2 $a$ is an iron bar or cross-head fixed to and projecting radially from the shaft $b$. $c\ c$ are insulated wire coils or windings on the bar $a$. Said circuit-windings are in planes parallel to the axis or shaft. These wires may be connected in any suitable way with a battery or other source of electricity. $d$ is a ring or wheel, which may be secured to a second shaft $e$ in any suitable way. It is provided with a flange $d'$, and this is notched to form upon it a series of horns $d^\times$. When one of the parts revolves without the other, eddy currents are generated and resistance is offered to such independent rotation. To favor this action, rings of metal of low electrical resistance—such as copper—may be fixed around the horns $d^\times$.

In Fig. 3 a similar construction to that shown in Fig. 1 is illustrated. The bar $a$, however, is provided with several horns $a'$, corresponding to the horns $d^\times$ upon the ring $d'$. The construction and arrangement are such that one member of the clutch may be driven continuously and the other member driven at will by properly controlling the electric currents. There is no frictional contact between the clutch members, but there is sufficient magnetic drag and attractive force to properly connect the two shafts to which the clutch members are applied.

I claim as my invention—

1. An electric clutch comprising a shaft with an iron cross-head upon it and another shaft aligned with the first-mentioned shaft and carrying an iron ring surrounding the cross-head and provided with projections $d^\times$ in close proximity to the extremities of the cross-head, and circuit-windings upon the cross-head in planes parallel to its axis of rotation.

2. An electric clutch comprising an iron ring provided with a series of horns $d^\times$, provided with rings of metal of low resistance, circuit-windings between the horns, and an iron cross-head mounted to rotate within the ring and having circuit-wires wound upon its opposite extremities in planes parallel to its axis of rotation.

PETER WILLIAM WILLANS.

Witnesses:
    JOSEPH LAKE,
        17 *Gracechurch Street, London.*
    G. F. WARREN,
        *Notary Public, London.*